May 7, 1935.   J. D. LANE   2,000,763
BAND
Original Filed Sept. 2, 1933
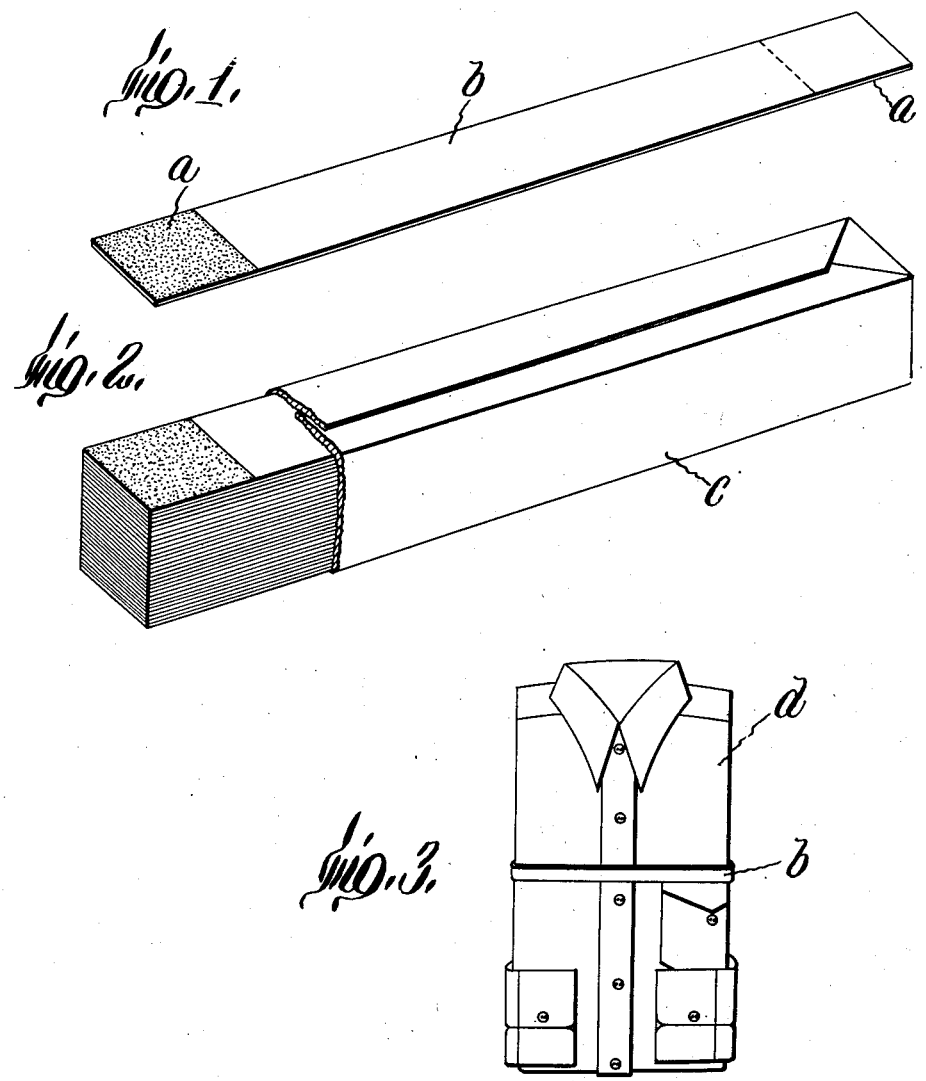
Inventor
John D. Lane
By Wright, Bronx, Quinby May
Attys Patented May 7, 1935

2,000,763

UNITED STATES PATENT OFFICE 2,000,763

BAND

John D. Lane, Boston, Mass., assignor to Ralph H. Wilbur, Melrose, Mass.

Original application filed September 2, 1933, Serial No. 687,951. Divided and this application May 5, 1934, Serial No. 724,127

2 Claims. (Cl. 24—17)

This invention relates to bands of flexible material and more especially to paper bands such as are used to hold laundered shirts in properly folded condition, to confine stacks of paper sheets, or to bind other articles into a bundle or in the desired array, the present application being a division of my application Serial No. 687,951, filed September 2, 1933.

In accordance with the present invention, I produce a band carrying on opposite faces of its opposite end portions coatings which are firmly cohesive even under light pressure, but which are practically non-adhesive with the uncoated surface of the paper or other flexible fibrous fabric of which the band may consist or with the uncoated surfaces of such ordinary objects as wood, glass, metal, etc. This means that when the band is put around the body to be confined and its end portions are brought together under pressure in overlapping contactual relationship, the desired binder is formed. This means further that the bands can be piled directly on top of one another to form a convenient package for storage and shipment and from which the bands may be successively removed without any trouble on account of "blocking" or sticking together.

With the foregoing and other features and objects in view, my invention will now be described in greater detail with particular reference to the accompanying drawing, wherein,—

Figure 1 illustrates in perspective a coated band embodying my invention.

Figure 2 shows in perspective a package of such bands, the outer wrapper for the package being partly removed.

Figure 3 depicts a folded shirt to which the band of the present invention has been applied.

For the purpose of producing the coatings on the band of the present invention, I preferably use a specially compounded rubber latex composition which, when dried, leaves a coating having the qualities already mentioned. There are three main ingredients in the composition, namely, rubber latex, a water-soluble colloid compatible with the latex and serving to destroy adhesiveness or tackiness in the dried latex or rubber coating without, however, destroying its cohesiveness, and a small amount of water-soluble and comparatively non-volatile plasticizer for the rubber coating also compatible with the latex. When I say that a material is compatible with latex, I mean that it does not tend to coagulate the latex so as to impair the spreadability of the latex as a smooth, uniform coating. A typical rubber latex composition answering well the purposes of my invention may be prepared by mixing the usual ammonia preserved latex of commerce of about 35% solids content with about 25% by volume of stiff tapioca starch paste or water-soluble casein paste, and about 2% to 5% by volume of glycerine. The stiff, water-soluble paste is not only a diluent which does away with adhesiveness or tackiness in the dried latex or rubber coating without impairing its cohesiveness, but which increases the thickness or viscosity of the latex so that a smooth coating of the desired thickness can be had with only a single application of the composition. The glycerine being comparatively involatile remains in the dried latex or rubber coating and preserves it in the desired cohesive state over a considerable period of time. Otherwise, the dried coating would, through oxidation, soon lose its cohesiveness. The glycerine also tends to keep the coating flexible or pliant, offsetting such stiffening effect as comes from the dried paste component. It is possible to modify the composition as by using concentrated latex, artificial latex, or other special form or compound of latex, by using diluents other than pastes which have the desired effect on the coating, and by using ethylene glycol or other suitable plasticizing agent for the rubber; and it is further possible to use rubber compounds or other compositions other than latex compositions described for the purpose of producing thin flexible coatings having the desired qualities.

As illustrated in Figure 1, the coating composition is applied only to opposite faces of the opposite end portions $a$ of a band $b$ which may consist of paper or equivalent flexible fibrous fabric. The rest of the band being left bare or uncoated, comparatively little coating composition is used. After the coatings have been dried and set so as to cause the desired coalescence and drying of the rubber latex particles, as in a current of warm air, the bands may be piled directly on top of one another and put in a wrapper or carton $c$ for storage and shipment, as shown in Figure 2. Inasmuch as the coatings carried by each band contact only with the bare or uncoated portions of adjacent bands and, despite their cohesiveness and exposed rubber surfaces, are devoid of adhesiveness, there is practically no tendency for the bands in a pile to stick together.

A band $b$ encompassing the body portion of a folded shirt $d$ as depicted in Figure 3 illustrates one of the uses to which the band of the present invention may be put. All that need be done in rendering the band operative is to bring it around the body of the folded shirt and press the overlapping end portions together by hand so as to cause the coatings to cohere to each other.

The principles of the present invention extend to the coating only of opposite faces of the side portions of bands of paper or other flexible material in those instances when the bands are used in such a way that the side portions, rather than the end portions, are brought together in overlapping contactual relationship to form a binder or wrapper for encompassing a body or a number of articles. Accordingly, I shall for convenience use the expression "opposite marginal portions" in the appended claims in describing bands wherein opposite faces of opposite marginal portions are coated as hereinbefore described, irrespective of whether such marginal portions are opposite side portions and/or opposite end portions of the bands. I shall use the term "band" as meaning a rectangular web or sheet of paper or equivalent flexible fibrous fabric of such dimensions as to be usable either as a binder or wrapper.

I am using the term "cohesive" in the foregoing description and in the appended claims in its strictly technical sense to mean the property of a material to unite with similar material and the term "adhesive" in its strictly technical sence to mean the property of a material to unite with dissimilar material.

I claim:—

1. A band of flexible material carrying thin flexible rubber coatings comprised of dried and coalesced rubber latex particles only on opposite faces of opposite marginal portions, said coatings presenting exposed rubber surfaces and being firmly cohesive under pressure but practically non-adhesive with the uncoated surface of the band.

2. A band of paper carrying thin flexible rubber coatings comprised of dried and coalesced rubber latex particles only on opposite faces of opposite marginal portions, said coatings presenting exposed rubber surfaces and being firmly cohesive under pressure but practically non-adhesive with the uncoated surface of the band.

JOHN D. LANE.